United States Patent
Baek et al.

(10) Patent No.: US 9,408,176 B2
(45) Date of Patent: *Aug. 2, 2016

(54) LOCATION AND STATE INFORMATION PROVIDING/INQUIRING SYSTEM USING WLAN/WPAN COMMUNICATION, LOG INFORMATION PROVIDING/INQUIRING SYSTEM AND METHOD, SERVICE SERVER AND CUSTOMER TERMINAL, LOCATION AND STATE PROVIDING/INQUIRING METHOD

(71) Applicant: SK TELECOM CO., LTD., Seoul (KR)

(72) Inventors: Seung Yoon Baek, Seoul (KR); Chae Hwan Cho, Gwacheon Si (KR); Hye Min Lee, Seongnam-Si (KR); Chang Seok Lee, Seoul (KR); Suk Yon Kang, Seoul (KR); Jong Tae Ihm, Seongnam-Si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/688,651

(22) Filed: Apr. 16, 2015

(65) Prior Publication Data

US 2015/0223188 A1 Aug. 6, 2015

Related U.S. Application Data

(63) Continuation of application No. 13/811,818, filed as application No. PCT/KR2011/005531 on Jul. 27, 2011, now Pat. No. 9,100,782.

(30) Foreign Application Priority Data

Jul. 27, 2010 (KR) .......................... 10-2010-0072260
Aug. 5, 2010 (KR) .......................... 10-2010-0075483
Aug. 5, 2010 (KR) .......................... 10-2010-0075485

(51) Int. Cl.
*H04M 1/00* (2006.01)
*H04W 64/00* (2009.01)
(Continued)

(52) U.S. Cl.
CPC .............. *H04W 64/00* (2013.01); *H04W 4/008* (2013.01); *H04W 4/02* (2013.01); *H04W 8/005* (2013.01); *H04W 84/12* (2013.01)

(58) Field of Classification Search
CPC .... H04W 64/00; H04W 4/02; H04M 1/72519
USPC .................. 455/456.1, 456.6, 550.1; 370/338
See application file for complete search history.

(56) References Cited

U.S. PATENT DOCUMENTS 8,787,960 B2* 7/2014 Stewart .................. G06Q 50/01
370/310
8,838,146 B2* 9/2014 Yoon ...................... G06Q 10/06
455/414.1

(Continued)

FOREIGN PATENT DOCUMENTS

JP 2006172223 A 6/2006
JP 2007281840 A 10/2007

(Continued)

OTHER PUBLICATIONS

International Search Report mailed Feb. 23, 2012 for PCT/KR2011/005531, citing the above reference(s).

(Continued)

*Primary Examiner* — Danh Le
(74) *Attorney, Agent, or Firm* — Hauptman Ham, LLP

(57) ABSTRACT

A mobile terminal device for positioning, includes: a wireless local area network (WLAN)/wireless personal area network (WPAN) communication unit to acquire identification information of one or more WLAN/WPAN communication modules of one or more adjacent other terminal devices; a request unit to transmit the identification information of the WLAN/WPAN communication modules to a service server to inquire about service subscription/unsubscription and request location and state information of the adjacent other terminal devices that are service subscribers; and a user interface unit to receive location and state information of the adjacent other terminal devices from the service server and display the location and state information on a screen.

13 Claims, 12 Drawing Sheets

(51) Int. Cl.
*H04W 4/00* (2009.01)
*H04W 4/02* (2009.01)
*H04W 8/00* (2009.01)
*H04W 84/12* (2009.01)

(56) References Cited

U.S. PATENT DOCUMENTS

| | | | |
|---|---|---|---|
| 9,112,925 B2* | 8/2015 | Ikeda | G06Q 30/02 |
| 9,119,027 B2* | 8/2015 | Sharon | G06F 21/6245 |
| 2004/0185850 A1 | 9/2004 | Ikeda et al. | |
| 2006/0245406 A1 | 11/2006 | Shim | |
| 2011/0122858 A1 | 5/2011 | Yashiro et al. | |
| 2012/0026971 A1 | 2/2012 | Khandelia et al. | |
| 2012/0208466 A1 | 8/2012 | Park et al. | |
| 2012/0320899 A1 | 12/2012 | Noldus | |
| 2013/0028248 A1 | 1/2013 | Cho | |
| 2013/0091309 A1 | 4/2013 | Bjontegard et al. | |

FOREIGN PATENT DOCUMENTS

| | | |
|---|---|---|
| KR | 1020060125963 A | 12/2006 |
| KR | 1020090075569 A | 7/2009 |

OTHER PUBLICATIONS

Korean Office Action dated Feb. 24, 2014, citing the above reference(s).

* cited by examiner

LOCATION AND STATE INFORMATION PROVIDING/INQUIRING SYSTEM USING WLAN/WPAN COMMUNICATION, LOG INFORMATION PROVIDING/INQUIRING SYSTEM AND METHOD, SERVICE SERVER AND CUSTOMER TERMINAL, LOCATION AND STATE PROVIDING/INQUIRING METHOD

CROSS-REFERENCE TO RELATED APPLICATION

The present application is a continuation of U.S. patent application Ser. No. 13/811,818 filed Mar. 22, 2013, which is a the National Phase application of International Application No. PCT/KR2011/005531 filed Jul. 27, 2011, which is based upon and claims the benefit of priorities from Korean Patent Application No. 10-2010-0072260, filed on Jul. 27, 2010, Korean Patent Application No. 10-2010-0075483, filed on Aug. 5, 2010, and Korean Patent Application No. 10-2010-0075485, filed on Aug. 5, 2010. The disclosures of the above-listed applications are hereby incorporated by reference herein in their entirety.

TECHNICAL FIELD

The present disclosure relates in some aspects to a location and state information providing/inquiring system using wireless local area network (WLAN)/wireless personal area network (WPAN) communication, a log information providing/inquiring system, a service server, a customer terminal device (hereinafter, referred to as "terminal" for convenience of description), a location and state information providing/inquiring method, and a log information providing/inquiring method. More particularly, the present disclosure relates to a location and state information providing/inquiring system using the WLAN/WPAN communication, a log information providing/inquiring system, a service server, a customer terminal device, a location and state information providing/inquiring method, and a log information providing/inquiring method, which can search adjacent other terminal devices (hereinafter, referred to as "terminals" for convenience of description) in real time by using WLAN/WPAN communication such as Bluetooth, Ultra Wide Band (UWB), and Zigbee, use location and state information of terminals subscribing the same service among the adjacent other terminals searched, and perform an update if location and log information of the terminals subscribing the same service among the other terminals searched are different.

BACKGROUND

The statements in this section merely provide background information related to the present disclosure and do not constitute prior art.

Fueled by the rapid development of electronic communication technologies, various wireless communication networks employing customer terminals are being developed. Conventional wireless communications have provided voice calling services for subscriber terminal users with no bounds on time and place and the operators offer text message services as a complement for the voice provision.

Ever since the recent development of wireless Internet has introduced a wireless Internet service via wireless communication network for mobile communication service subscribers, more enterprises participated in developing wireless Internet technologies.

Among wireless Internet services using customer terminals, a Location Based Service (LBS) has attracted much attention due to the wide application and convenience. The LBS is a communication service that determines a location of a customer terminal and provides additional information related to the location determined. The LBS is used in various fields and situations such as a rescue request, a countermeasure against a crime report, a Geographical Information System (GIS) for providing adjacent regional information, mobile charge differentiation by locations, traffic information, vehicle navigation, physical distribution control, and location-based Customer Relationship Management (CRM).

The inventor(s) has noted that a recent LBS tends to expand service coverage by using both location information of a mobile terminal itself and that of other terminals. A scheme of inquiring locations of other terminals is performed through an asynchronous process. That is, a scheme in use provides displays of others' terminal locations by inquiring their locational track records after finally accessing the service. However, the inventor(s) has experienced that although this method of inquiring others' locations tells how much time has passed since the locational log of their terminals on screen, it is very likely that the others' terminals have changed their locations, which makes it difficult for the LBS user or positioner to find the locations and states of the others' terminals at the current location. The inventor(s) has noted that in particular, a moving positioner may not be interested so much in the very locational information of others moving places as the state information associated with the others' locations. However, the inventor(s) has experienced that the current technology is difficult to inquire the states of neighboring users in real time, but rather permits to check information on who gave positional records along the positioner's route. The inventor(s) has experienced that this limits services from evolving to the stage where the LBS user wants to know people around by their state information.

SUMMARY

In accordance with some embodiments of the present disclosure, a mobile terminal device for positioning, comprises a wireless local area network (WLAN)/wireless personal area network (WPAN) communication unit, a request unit, and a user interface unit. The wireless local area network (WLAN)/wireless personal area network (WPAN) communication unit is configured to acquire identification information of one or more WLAN/WPAN communication modules of one or more adjacent other terminal devices. The request unit is configured to transmit the identification information of the WLAN/WPAN communication modules to a service server to inquire about service subscription/unsubscription and request location and state information of the adjacent other terminal devices that are service subscribers. And the user interface unit is configured to receive location and state information of the adjacent other t terminal devices from the service server and display the location and state information on a screen.

In accordance with some embodiments of the present disclosure, a mobile terminal device performs a method for inquiring location and state information of other terminal devices, the method including: using a WLAN/WPAN communication module to acquire identification information of one or more WLAN/WPAN communication modules of one or more adjacent other terminal devices; transmitting the identification information of the WLAN/WPAN communication modules to a service server to inquire about service subscription/unsubscription and request location and state information of the adjacent other terminal devices that are service subscribers; and receiving location and state information of the adjacent other terminal devices from the service server and displaying the location and state information on a screen.

DETAILED DESCRIPTION

Hereinafter, a location and state information providing/inquiring system using WLAN/WPAN communication, a log information providing/inquiring system, a service server, a customer terminal device (hereinafter, referred to as "terminal" for convenience of description), a location and state information providing/inquiring method, and a log information providing/inquiring method according to embodiments of the present disclosure will be described in detail with reference to the accompanying drawings.

Some embodiments of the present disclosure provide a location and state information providing/inquiring system using WLAN/WPAN communication, a service server, a customer terminal, and a location and state information providing/inquiring method, which can search adjacent other terminal devices (hereinafter, referred to as "terminals" for convenience of description) in real time by using WLAN/WPAN communication such as Bluetooth, UWB, and Zigbee, and use location and state information of terminals subscribing the same service among the adjacent other terminals searched.

Some embodiments of the present disclosure also provide a log information providing/inquiring system, a service server, a customer terminal, and a log information providing/inquiring method, which can search adjacent other terminals in real time by using the WLAN/WPAN communication such as Bluetooth, UWB, and Zigbee when a positioner is moving in a service of providing log information including access time point and location information of subscriber terminals, and provide/inquire log information of others in real time by performing an update if location and log information of terminals subscribing the same service among the adjacent other terminals searched are different.

Figure 1:
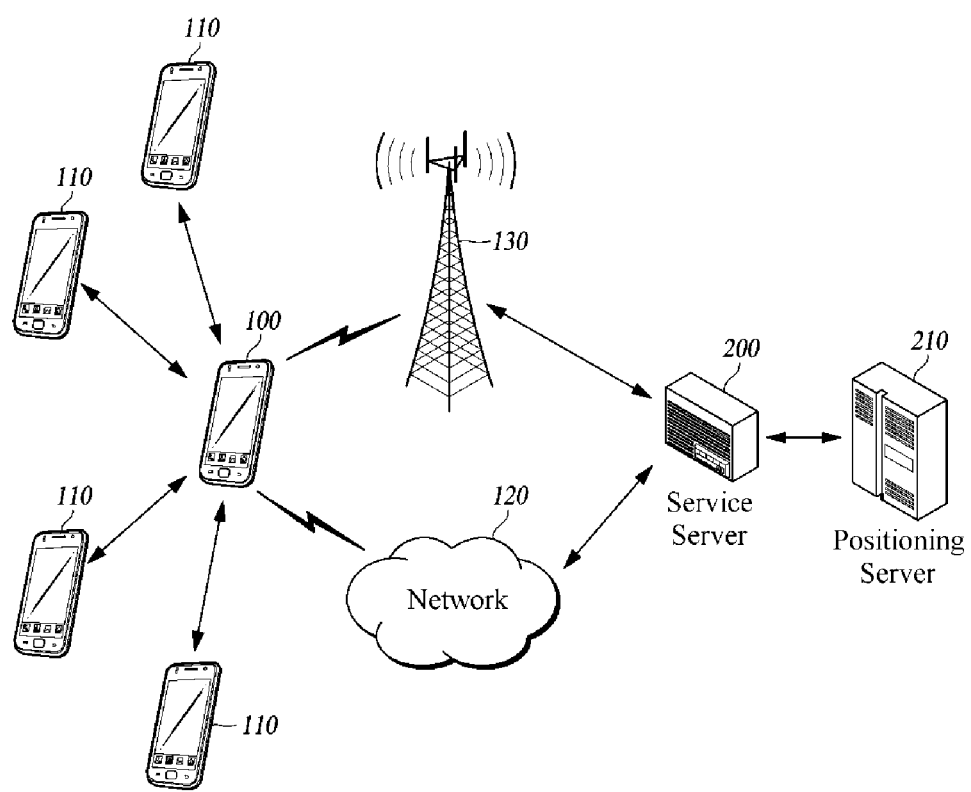
FIG. 1 is a diagram schematically showing a location and state information/log information providing/inquiring system according to one embodiment of the present disclosure.

FIG. 1 is a diagram schematically showing a location and state information/log information providing/inquiring system according to one embodiment of the present disclosure. Referring to FIG. 1, a location and state information providing/inquiring system according to one embodiment of the present disclosure may include a mobile terminal 100, a service server 200, and a positioning server 210.

The mobile terminal 100 may include a WLAN/WPAN communication module. The mobile terminal 100 may use the WLAN/WPAN communication module to acquire identification information of WLAN/WPAN communication modules of one or more adjacent other terminals 110 and transmit the identification information of the WLAN/WPAN communication modules of the other terminals 110 to the service server 200 through a network 120 or a mobile network 130. Examples of the WLAN/WPAN communication modules may include Bluetooth communication modules, Ultra Wide Band (UWB) communication modules, and Zigbee communication modules. In the following description, it is assumed that the mobile terminal 100 includes a Bluetooth communication module as the WLAN/WPAN communication module.

In addition, the mobile terminal 100 may use the WLAN/WPAN communication module to acquire Media Access Control (MAC) addresses of the WLAN/WPAN communication modules of the other terminals 110 capable of communication. The MAC addresses are physical addresses of Ethernet. A MAC address is stored in a Read Only Memory (ROM) of an Ethernet card, and generally has an address size of 48 bits. When Institute of Electrical and Electronics Engineers (IEEE) allocates a 24-bit vendor for the first half part, a vendor side allocates 24 bits for the second half part. On an initial screen of a monitor for monitoring an operation state of a communication network, a name of each machine is pre-allocated to a Network Interface Card (NIC) and displayed with a MAC address. In general, it is written in a ROM on a Local Area Network (LAN) port of a LAN device or a personal computer (PC), and a source address is designated and used for a front (header) of a MAC layer data frame.

The network 120 should be understood as a broad sense including not only wireless Internet networks such as Wireless Broadband (WiBro) and Long Term Evolution (LTE) and but also wired networks such as Value Added Network (VAN). Examples of the mobile network 130 include a Code Division Multiple Access (CDMA) network and a Wideband CDMA (WCDMA) network.

The service server 200 provides location and state information of the other terminals 110. The service server 200 may interwork with various servers such as a messenger service providing server and a friend search service providing server. In this case, the service server 200 stores identification information of subscriber terminals of service subscribers, receives identification information of WLAN/WPAN communication modules of the other terminals 110 from the mobile terminal 100, and transmits a list of matched subscribers to the mobile terminal 100. Specifically, the service server 200 stores MAC addresses of Bluetooth communication modules that are WLAN/WPAN communication modules installed in terminals of subscribers subscribing to a service, compares Bluetooth MAC addresses of the WLAN/WPAN communication modules of the other terminals 110 received from the mobile terminal 100 with the stored MAC addresses of the service subscribers, and transmits a subscriber list of matched MAC addresses to the mobile terminal 100. Thus, the subscriber list transmitted by the service server 200 to the mobile terminal 100 is a list of users subscribing to the service among the users of the other terminals 110 adjacent to the mobile terminal 100.

The service server 200 may store identification information of terminals of service subscribers and identification numbers of one or more WLAN/WPAN communication modules of the terminals of the service subscribers as a database. Specifically, terminals of service subscribers may include one or more WLAN/WPAN communication modules, and the service server 200 may store identification information of subscriber terminals subscribing to the service and MAC addresses of Bluetooth communication modules that are WLAN/WPAN communication modules installed in the subscriber terminals. The service subscribers may use different terminals with the same phone number, and in this case, the service server 200 may identify the respective terminals of the same phone number based on the identification information of the respective subscriber terminals.

In the event of access by subscriber terminals, the service server 200 records log information including access time point and location information, and searches for subscriber terminals corresponding to the identification information of the WLAN/WPAN communication modules of the other terminals 110 received from the mobile terminal 100 based on the location information recorded. For example, if one subscriber terminal includes a plurality of WLAN/WPAN communication modules, or if a user changes a subscriber terminal while maintaining the previous phone number, the service server 200 searches for subscriber terminals corresponding to the identification information of the WLAN/WPAN communication modules of the other terminals 110 received from the mobile terminal 100, based on the latest log information of others adjacent to a positioner. In this case, the service server 200 may transmit a subscriber list corresponding to the searched subscriber terminals to the mobile terminal 100.

Examples of the identification information of the subscriber terminals may include Mobile Identification Number (MIN) information, International Mobile Station Identity (IMSI) information, and Mobile Station International ISDN Number (MSISDN) information of the subscriber terminals.

MIN is a 34-bit number corresponding to a digital representation of a 10-digit phone number allocated to a mobile station (mobile phone terminal), and there are MIM 1 and MIN2 as designated numbers (or phone numbers) of a terminal. MIN1 is a 7-digit phone number allocated to a terminal and is comprised of 24 bits. MIN2 is a 3-digit region number and is comprised of 10 bits. For example, in 011-YYY-XXXX, MIN1 is YYY-XXXX and MIN2 is 011. MIN is originally used to identify North American mobile phone terminals. Since the 10-digit MIN cannot contain additional information necessary for international roaming, an IMSI system became necessary.

IMSI is a 15-digit unique identification number allocated to a mobile terminal in Global System for Mobile communications (GSM) service subscription, and this number is comprised of a Mobile Country Code (MCC), a Mobile Network Code (MNC), a Mobile Subscriber Identifier Number (MSIN), and an international mobile subscriber identifier number. MCC and MNC uniquely identify a home network of a mobile phone subscriber in any network over the whole world. In other words, IMSI is configured such that a visited network (other network capable of providing a roaming service) may analyze up to first six digits to inquire a home network. If MCC and MNC are given, MSIN uniquely identifies a mobile phone terminal.

MSISDN allocates two numbers to a WCDMA IMT-2000 subscriber. An IMSI is allocated to a Universal Subscriber Identity Module (USIM) card, and an MSISDN is allocated to a terminal. For example, allocation of 010X by a recent mobile terminal number system is an MSISDN, and a country code is included in the MSISDN. Thus, even without expecting the location of a counterpart, without separate dialing, a subscriber can call to know that the counterpart is located in other country. One IMSI may have four MSISDNs.

The positioning server 210 positions terminals of service subscribers. The positioning server 210 provides a Location Based Service (LBS) to the mobile terminal 100. The positioning server 210 may store positioned location information of terminals of service subscribers.

Positioning schemes for providing an LBS to mobile terminals include a network based positioning scheme detecting a location by way of software using a radiowave environment, which is a cell radius of a base station in a mobile communication network, in order to position a mobile terminal, a handset-based positioning scheme using a Global Positioning System (GPS) receiver installed in a mobile terminal, and a hybrid of the two positioning schemes.

A GPS scheme is a handset-based scheme. The GPS scheme is usable in both a European GSM network using a Time Division Multiple Access (TDMA) wireless access scheme and an IS-95 network using a Code Division Multiple Access (CDMA) wireless access scheme. In the GSM wireless access scheme, a mobile terminal is positioned by communication of messages between the mobile terminal including a GPS receiver and a SPC (Supl Positioning Center) in a GSM network through an OMA SUPL (Secure User Plane Location) interface and a SUPL POS (GSM A-GPS protocol embedded with RRLP (Radio Resource Location Protocol)) that is a protocol for A-GPS positioning in OMA SUPL, and location determination is very accurate because a location is positioned by receiving four or more satellite signals from GPS satellites. An A-GPS system includes an SPC (SUPL Positioning Center) for calculating a location by receiving satellite signals received by a mobile terminal, and an SLC (SUPL Location Center) for processing calculation by base station information in a GSM network and associating the same with other systems.

An E-OTD (Enhanced Observed Time Difference) scheme is a typical network-based positioning scheme. The E-OTD scheme was standardized through LCS Release 98 and 99 by the GSM standardization committee of the European TDMA-based GSM scheme using the TDMA wireless access standard. In the E-OTD scheme, a mobile station determines a location by calculating a relative arrival time and a distance difference between signals received from three or more base stations. The E-OTD scheme is used to perform network-based positioning by combining time difference concepts such as OTD (Observed Time Difference), RTD (Relative Time Difference), and GTD (Geometric Time Difference).

The OTD is a difference between the arrival times of signals arriving at a mobile terminal from two base stations. The OTD may be obtained by measuring UE Rx-Tx Time Difference Type 2 Parameters in a GSM-based mobile terminal.

The RTD is a parameter for obtaining a start time difference between signals received from two base stations. The RTD can be measured only when a base station is equipped with a Location Measurement Unit (LMU) that is a separate measurement device. Thus, in order to obtain "GTD=OTD− RTD" that is a key parameter for network-based location calculation recommended in the GSM standard, both OTD and RTD should be obtained to perform E-OTD based network location calculation.

A network-based positioning technology transmits data (such as PPM, OTD, and RTD) measured by a mobile terminal and an LMU by a protocol (such as IS-801, RRLP, or RRC) arranged between the mobile terminal and a server to a positioning server, and performs a positioning function of the mobile terminal in the positioning server by using the measured data (such as PPM, OTD, and RTD) of the mobile terminal. The positioning server performs network-based positioning (a scheme for positioning a location of a terminal by a server, except a location measurement scheme using GPS satellites), and transmits the result to a target requesting a positioning service (such as an SLC, a CP (Contents Provider), and a mobile terminal requesting the service).

In general, such a network-based positioning technology uses triangulation using coordinates and distances of three or more access points (APs) with known locations, and is classified into a method using measured (predicted) distance information and a method not using distance information.

The method using distance information measures the distances from a mobile terminal to three or more APs with known locations, and performs triangulation using the measured distances and location information of the APs, thereby acquiring the location of the mobile terminal. In this case, the distance between the mobile terminal and the AP is measured (predicted) by various methods such as ToA (Time of Arrival), TdoA (Time difference of Arrival), and RSS (Received Signal Strength).

ToA is a method of measuring a distance by using the moving time of a signal with a known propagation speed between APs. TdoA is a method of measuring a distance by using the arrival time difference of signals between two APs by simultaneously transmitting the two signals with different velocities. These two methods provide more accurate measurement results when signal speeds are lower and there is no obstacle between APs.

RSS is a method of measuring a distance by using the strength of a received signal arriving at a node. An RF signal used in the RSS has better diffraction characteristics than ultrasonic waves or sonic waves. Therefore, the RF signal used in the RSS can easily secure Line-of-Sight (LoS), and does not require additional hardware.

Examples of the location determination method not using distance information include a Centroid method and an APIT (Approximate Point In Triangulation) method. These methods are introduced based on the fact that the method using distance information may spread an error in a sensor network forming a multi-hop.

In the Centroid method, when regularly-arranged APs transmit their location information to adjacent APs, the adjacent APs predict (measure) their locations by comparing the strengths of signals received from the previous APs. When APs are arranged more regularly, there are more APs capable of communication and RF propagation environment are maintained, the Centroid method can provide more accurate measurement results. The APIT method predicts a location by using information as to whether a mobile terminal to be positioned is located in a triangle formed by APs. The positioning server 210 may provide a location-based service by various methods described above.

The positioning server 210 interworks with the service server 200. If the mobile terminal 100 selects one or more service subscribers based on a subscriber list transmitted by the service server 200 to the mobile terminal 100, the positioning server 210 may transmit location and state information of terminals corresponding to the service subscribers selected to the mobile terminal 100.

If the service server 200 searches for identification information of matched subscriber terminals based on identification information of the WLAN/WPAN communication modules of the other terminals 110 received from the mobile terminal 100, the positioning server 210 may transmit location and state information of terminals of service subscribers searched by the service server 200 to the mobile terminal 100. Herein, although FIG. 1 shows that the service server 200 and the positioning server 210 are configured separately, the positioning server 210 may be integrated into the service server 200.

The location and state information providing/inquiring system of FIG. 1 using WLAN/WPAN communication may also be used as a log information providing/inquiring system. In this case, since the elements of the log information providing/inquiring system are identical to or similar to the elements of the location and state information providing/inquiring system of FIG. 1 using WLAN/WPAN communication, a description will be made using the same reference numerals. The mobile terminal 100, the other terminals 110, the network 120, the mobile network 130, and the positioning server 210 are the same as those described above.

In this case, the service server 200 provides log information of the other terminals 110. The service server 200 may store identification information of terminals of service subscribers, and record log information including access time point and location information of subscriber terminals when the subscriber terminals access the network 120 or the mobile network 130. The service server 200 may receive identification information of the WLAN/WPAN communication modules of the other terminals 110 from a customer terminal 100 and transmit a list of matched subscribers to the customer terminal 100. Specifically, the service server 200 may store MAC addresses of Bluetooth communication modules that are WLAN/WPAN communication modules installed in terminals of subscribers subscribing to the service, compare Bluetooth MAC addresses of the WLAN/WPAN communication modules of the other terminals 110 received from the customer terminal 100 with the stored MAC addresses of the service subscribers, and transmit a subscriber list of matched MAC addresses to the customer terminal 100. In this case, the subscriber list transmitted by the service server 200 to the customer terminal 100 is a list of users subscribing to the service among the users of the other terminals 110 adjacent to the customer terminal 100.

The service server 200 may position the current locations of subscriber terminals matching with the identification information of the WLAN/WPAN communication modules of the other terminals 110 received from the customer terminal 100 by interworking with the positioning server 210, and update log information based on the positioning result of the positioning server 210 only when the access time point and location information included in the log information of the subscriber terminals are different from the positioned current locations.

Figure 2:
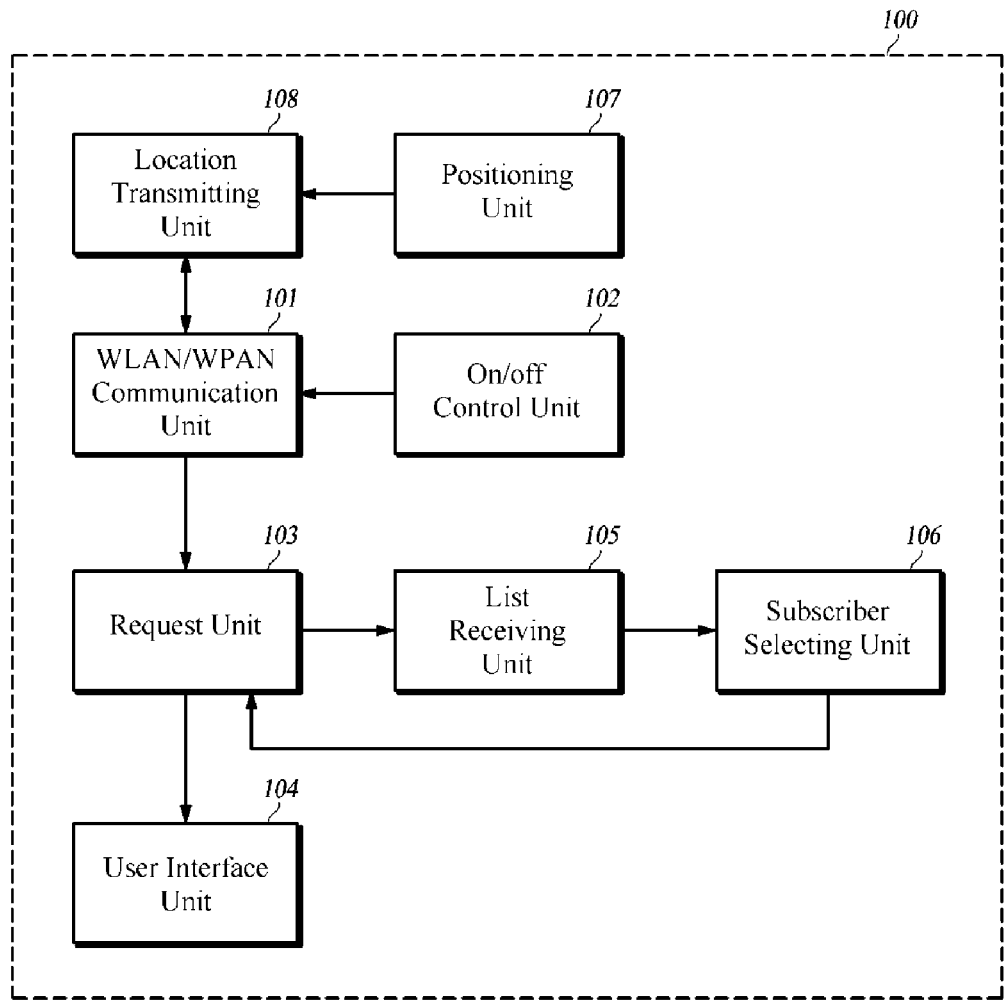
FIG. 2 is a diagram schematically showing a configuration of a mobile terminal usable in the location and state information providing/inquiring system of FIG. 1.

FIG. 2 is a diagram schematically showing a configuration of a mobile terminal usable in the location and state information providing/inquiring system of FIG. 1. Referring to FIG.

2, a mobile terminal 100 according to one embodiment of the present disclosure may include a WLAN/WPAN communication unit 101, an on/off control unit 102, a request unit 103, a user interface unit 104, a list receiving unit 105, a subscriber selecting unit 106, a positioning unit 107, and a location transmitting unit 108.

The WLAN/WPAN communication unit 101 is the WLAN/WPAN communication module described above, and may be implemented by a Bluetooth communication module, a UWB communication module, a Zigbee communication module, or the like. The WLAN/WPAN communication unit 101 acquires identification information of WLAN/WPAN communication modules of one or more other terminals adjacent to the current location of the mobile terminal 100. In this case, the WLAN/WPAN communication unit 101 may acquire MAC addresses of WLAN/WPAN communication modules capable of communication from the adjacent other terminals 110 as the identification information. For example, if the mobile terminal 100 includes a Bluetooth communication module, the Bluetooth communication module may acquire MAC addresses of Bluetooth communication modules of the adjacent other terminals 110 as the identification information.

The on/off control unit 102 controls a power on/off of the WLAN/WPAN communication unit 101. Specifically, when the WLAN/WPAN communication unit 101 is powered off, the on/off control unit 102 may turn on the WLAN/WPAN communication unit 101 in order to inquire the location and state information of the other terminals 110 according to the present invention, and may display characters and images on a screen of the mobile terminal 100 when necessary.

The request unit 103 transmits the identification information of the WLAN/WPAN communication modules of the other terminals 110 to the service server 200 to inquire about service subscription/unsubscription of the other terminals 110 and request location and state information of the other terminals 110 that are service subscribers. For example, if the respective identification information elements acquired by the WLAN/WPAN communication unit 101 from a plurality of adjacent other terminals 110 are A, B, C, and D, the request unit 103 may transmit A, B, C, and D to the service server 200 to inquire about service subscription/unsubscription and request location and state information of the other terminals 110 that are service subscribers.

The request unit 103 may transmit the identification information of the WLAN/WPAN communication modules of the other terminals 110 to the service server 200, and request location and state information of the other terminals 110 based on the log information of the other terminals 110 recorded in the service server 200. For example, if the respective communication module identification information elements acquired by the WLAN/WPAN communication unit 101 from a plurality of adjacent other terminals 110 are A, B, C, and D, the request unit 103 may transmit A, B, C, and D to the service server 200, and request location and state information of the other terminals 110 based on the recorded log information of the other terminals 110.

The user interface unit 104 receives location and state information of the other terminals 110 from the service server 200 and displays the location and state information on a screen of the mobile terminal 100. For example, as described above, if the identification information elements of the WLAN/WPAN communication modules of the other terminals 110 transmitted by the request unit 103 are A, B, C, and D, and when only A and B match with the subscriber identification information stored in the service server 200 (that is, when only users of the other terminals corresponding to A and B subscribe to the same service as a user of the mobile terminal 100), the user interface unit 104 receives location and state information of the other terminals 110 corresponding to A and B from the service server 200 and displays the location and state information on the screen of the mobile terminal 100.

The list receiving unit 105 may receive a list of service subscribers corresponding to the location and state information of the other terminals 110 requested by the request unit 103 from the service server 200. For example, as described above, if the identification information elements of the WLAN/WPAN communication modules of the other terminals 110 transmitted by the request unit 103 are A, B, C, and D, and when only A and B match with the subscriber identification information stored in the service server 200 or the log information is recorded by the service server 200, the list receiving unit 105 may request a subscriber list corresponding to the request of the request unit 103 and receive a subscriber list corresponding to A and B.

The subscriber selecting unit 106 may select one or more service subscribers from the list of service subscribers received from the service server 200. For example, as described above, if the subscriber list received by the list receiving unit 105 is subscribers corresponding to A and B, the subscriber selecting unit 106 may select one or all of the subscribers. In this case, a subscriber selection signal selected by the subscriber selecting unit 106 is transmitted to the service server 200. Accordingly, the user interface unit 104 receives location and state information of the other terminals 110 corresponding to the service subscribers selected by the subscriber selecting unit 106 and displays the location and state information on the screen of the mobile terminal 100.

The positioning unit 107 is a positioning module included in the mobile terminal 100. In order to receive the above location-based service, the positioning unit 107 may perform a GPS signal reception function and a triangulation function to position the current location of the mobile terminal 100.

The position transmitting unit 108 may transmits a value of the current location of the mobile terminal 100 positioned by the positioning unit 107 to the service server 200. In this case, it is assumed that the service server 200 interworks with the positioning server 210 to transmit the location value of the mobile terminal 100 to the positioning server 210, or includes the positioning server 210.

Figure 3:
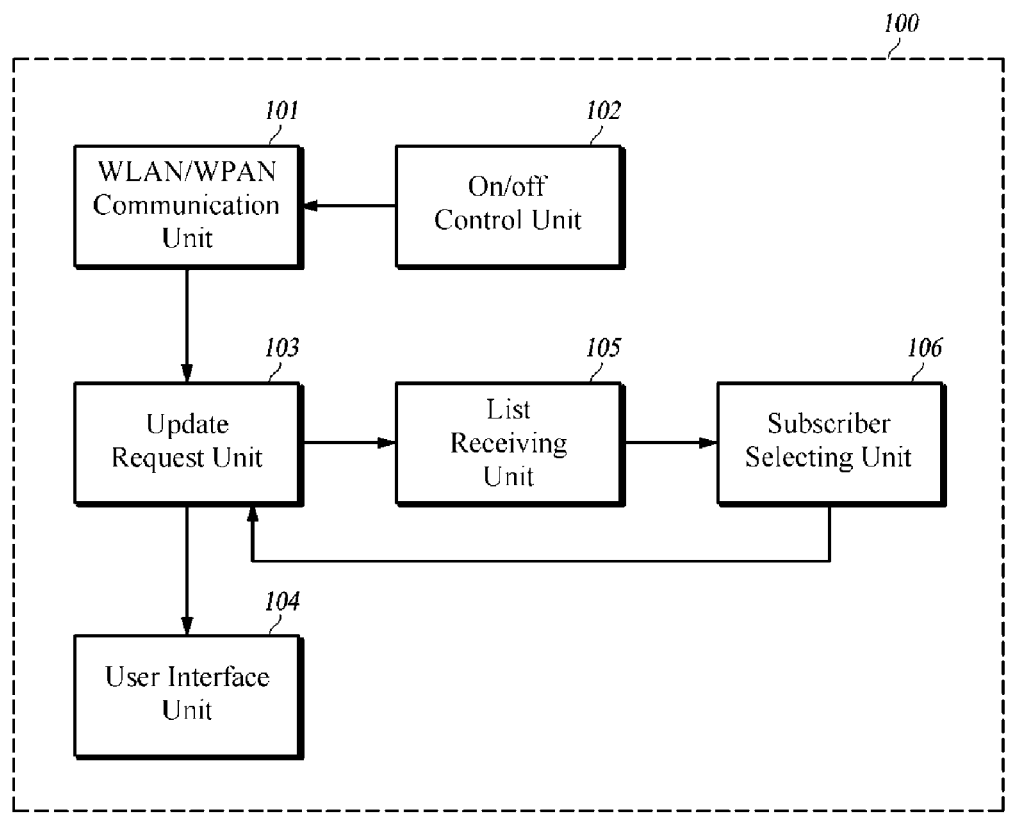
FIG. 3 is a diagram schematically showing a configuration of a customer terminal usable in the log information providing/inquiring system of FIG. 1.

FIG. 3 is a diagram schematically showing a configuration of a customer terminal usable in the log information providing/inquiring system of FIG. 1. Referring to FIG. 3, a customer terminal 100 according to one embodiment of the present disclosure may include a WLAN/WPAN communication unit 101, an on/off control unit 102, an update request unit 103, a user interface unit 104, a list receiving unit 105, and a subscriber selecting unit 106. Herein, since the respective elements of the customer terminal 100 usable in the log information providing/inquiring system are identical to or similar to the respective elements of the mobile terminal 100 of FIG. 2, like reference numerals will be used to denote like elements and a detailed description of the elements performing the same functions will be omitted.

The on/off control unit 102 controls a power on/off of the WLAN/WPAN communication unit 101. Specifically, when the WLAN/WPAN communication unit 101 is powered off, the on/off control unit 102 may turn on the WLAN/WPAN communication unit 101 in order to inquire the log information of the other terminals 110 according to the present invention, and may display characters and images on a screen of the mobile terminal 100 when necessary.

The update request unit 103 transmits the identification information of the mobile communication modules of the other terminals 110 to the service server 200 to request log information of the other terminals 110. For example, if the respective communication module identification information elements acquired by the WLAN/WPAN communication unit 101 from a plurality of adjacent other terminals 110 are A, B, C, and D, the request unit 103 may transmit A, B, C, and D to the service server 200 to request log information of the other terminals 110.

The user interface unit 104 receives log information of the other terminals 110 from the service server 200 and displays the log information on a screen of the customer terminal 100. For example, as described above, if the identification information elements of the WLAN/WPAN communication modules of the other terminals 110 transmitted by the request unit 103 are A, B, C, and D, and when only A and B match with the subscriber identification information stored in the service server 200 (that is, when only users of the other terminals corresponding to A and B subscribe to the same service as a user of the mobile terminal 100), the user interface unit 104 receives log information of the other terminals 110 corresponding to A and B from the service server 200 and displays the log information on the screen of the customer terminal 100.

The list receiving unit 105 may receive a list of service subscribers corresponding to the identification information of the WLAN/WPAN communication modules of the other terminals 110 requested by the update request unit 103 from the service server 200. For example, as described above, if the identification information elements of the WLAN/WPAN communication modules of the other terminals 110 transmitted by the update request unit 103 are A, B, C, and D, and when only A and B match with the subscriber identification information stored in the service server 200, the list receiving unit 105 may request a subscriber list corresponding to the request of the update request unit 103 and receive a subscriber list corresponding to A and B.

Figure 4:
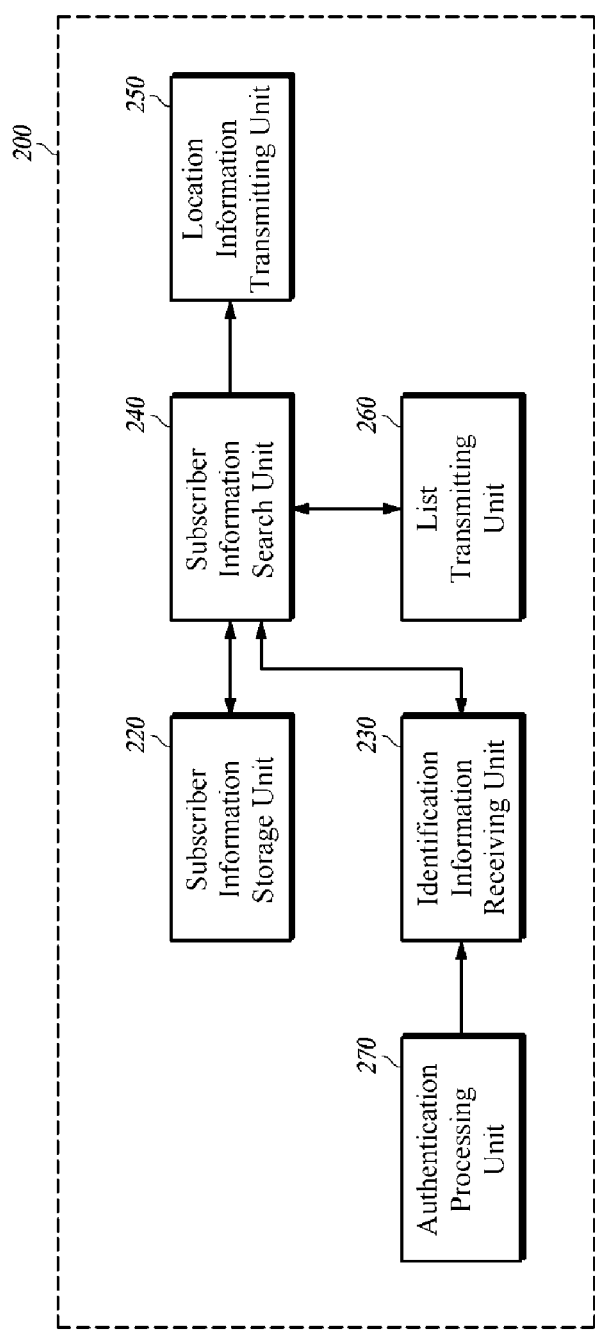
FIG. 4 is a diagram schematically showing a configuration of a service server usable in the location and state information providing/inquiring system of FIG. 1.

FIG. 4 is a diagram schematically showing one embodiment of a configuration of a service server usable in the location and state information providing/inquiring system of FIG. 1. Referring to FIG. 4, a service server 200 according to one embodiment of the present disclosure may include a subscriber information storage unit 220, an identification information receiving unit 230, a subscriber information search unit 240, a location information transmitting unit 250, a list transmitting unit 260, and an authentication processing unit 270.

The subscriber information storage unit 220 stores identification information of subscriber terminals. In this case, the subscriber information storage unit 220 may store MAC addresses of the WLAN/WPAN communication modules 101 of the mobile terminal 100 subscribing to a location and state information providing service for the other terminals 110 as the identification information of the subscriber terminals.

The identification information receiving unit 230 receives identification information of WLAN/WPAN communication modules of one or more adjacent other terminals 110 from the mobile terminal 100.

The subscriber information search unit 240 searches the subscriber identification information stored in the subscriber information storage unit 220 for subscriber identification information matching with the identification information of the WLAN/WPAN communication modules of the other terminals 110 received through the identification information receiving unit 230.

The location information transmitting unit 250 interworks with the positioning server 210, inquires location and state information of the other terminals 110 corresponding to the subscriber identification information searched, and transmits the location and state information of the other terminals 110 to the mobile terminal 100.

The list transmitting unit 260 may transmit a subscriber list corresponding to the subscriber identification information searched by the subscriber information search unit 240 to the mobile terminal 100. For example, as described above, if the identification information elements of the WLAN/WPAN communication modules of the other terminals 110 received from the mobile terminal 100 are A, B, C, and D, and when only A and B match with the subscriber identification information stored in the subscriber information storage unit 220, the list transmitting unit 260 may transmit a subscriber list corresponding to the subscriber identification information elements A and B to the mobile terminal 100. In this case, among the subscriber list transmitted by the list transmitting unit 260 to the mobile terminal 100, the location information transmitting unit 250 may transmit only the location and state information of the other terminals 110 corresponding to the subscribers selected by the mobile terminal 100 to the mobile terminal 100.

The authentication processing unit 270 authenticates the mobile terminal 100 accesses the service server 200. Specifically, only the mobile terminal 100 authenticated by the authentication processing unit 270 may receive a location and state information providing service for the other terminals 110 according to one embodiment of the present invention. To this end, the identification information receiving unit 230 may be configured to receive the identification information of the WLAN/WPAN communication modules of the other terminals 110 from the mobile terminal 100 authenticated by the authentication processing unit 270.

Figure 5:
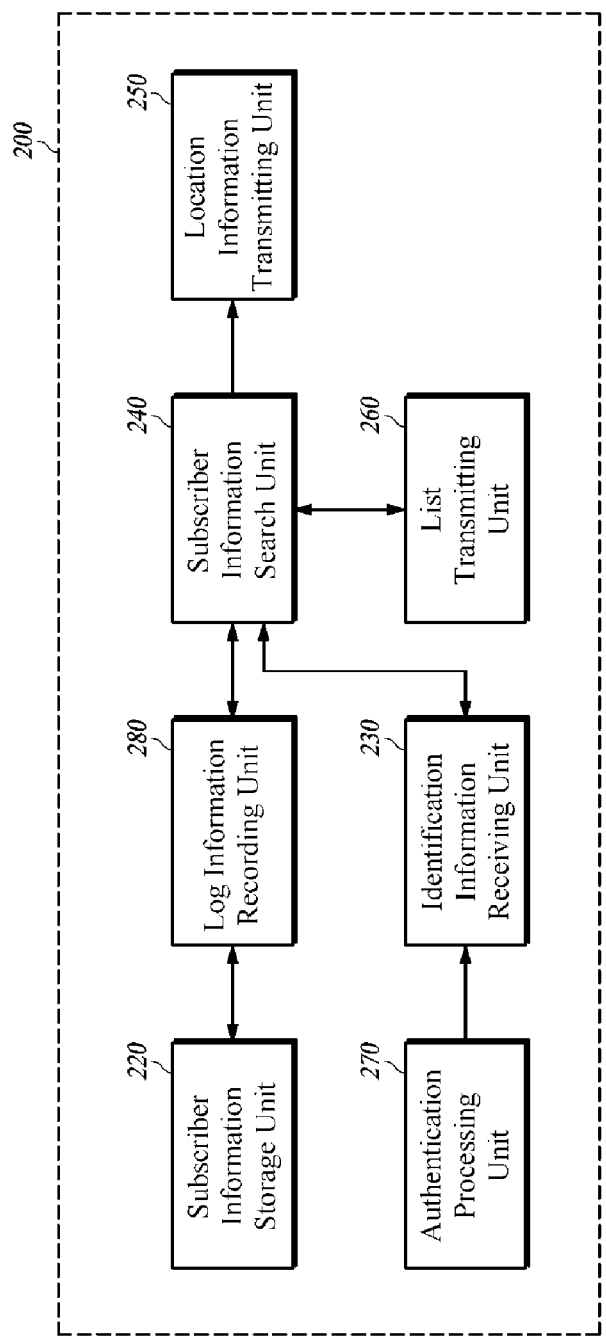
FIG. 5 is a diagram schematically showing another embodiment of a configuration of a service server usable in the location and state information providing/inquiring system of FIG. 1.

FIG. 5 is a diagram schematically showing another embodiment of a configuration of a service server usable in the location and state information providing/inquiring system of FIG. 1. Referring to FIG. 5, a service server 200 according to one embodiment of the present disclosure may include a subscriber information storage unit 220, an identification information receiving unit 230, a subscriber information search unit 240, a location information transmitting unit 250, a list transmitting unit 260, an authentication processing unit 270, and a log information recording unit 280. Herein, like reference numerals will be used to denote elements identical to or similar to the elements of the service server of FIG. 4.

The subscriber information storage unit 220 stores identification information of subscriber terminals and identification information of WLAN/WPAN communication modules of the subscriber terminals. In this case, the subscriber information storage unit 220 may store MIN information, MSISDN information, and IMSI information of subscriber terminals of subscribers subscribing to a location and state information providing service for the other terminals 110 and MAC addresses of the WLAN/WPAN communication modules 101 of the subscriber terminals as the identification information of the subscriber terminals.

The log information recording unit 280 records log information including access time point and location information of subscriber terminals in the event of access to the service server 200 by the subscriber terminals stored in the subscriber information storage unit 220.

The identification information receiving unit 240 receives identification information of WLAN/WPAN communication modules of one or more adjacent other terminals 110 from the mobile terminal 100. In this case, identification information of the other terminals 110 may not be received.

The subscriber information search unit 240 searches the subscriber log information recorded in the log information recording unit 280 for subscriber log information matching with the identification information of the WLAN/WPAN communication modules of the other terminals 110 received through the identification information receiving unit 230.

The location information transmitting unit 250 transmits the subscriber log information searched from the log information recording unit 280 to the mobile terminal 100. Specifically, since the subscriber terminals and the WLAN/WPAN communication modules of the subscriber terminals have unique identification information, the subscriber information search unit 240 searches log information of the subscriber terminals corresponding to the identification information of the WLAN/WPAN communication modules of the other terminals 110 received through the identification information receiving unit 230, and the location information transmitting unit 250 transmits the log information to the mobile terminal 100.

The list transmitting unit 260 may transmit a subscriber list corresponding to the subscriber log information searched by the subscriber information search unit 240 to the mobile terminal 100. For example, as described above, if the identification information elements of the other terminals 110 received from the mobile terminal 100 are A, B, C, and D, and when subscriber log information corresponding to only A and B is recorded by the log information recording unit 280, the list transmitting unit 260 may transmit a subscriber list corresponding to the subscriber identification information elements A and B to the mobile terminal 100. In this case, among the subscriber list transmitted by the list transmitting unit 260 to the mobile terminal 100, the location information transmitting unit 250 may transmit only the location and state information of the other terminals 110 corresponding to the subscribers selected by the mobile terminal 100 to the mobile terminal 100.

The authentication processing unit 270 authenticates the mobile terminal 100 accesses the service server 200. Specifically, only the mobile terminal 100 authenticated by the authentication processing unit 270 may receive a location and state information providing service for the other terminals 110 according to one embodiment of the present invention. To this end, the identification information receiving unit 230 may be configured to receive the identification information of the WLAN/WPAN communication modules of the other terminals 110 from the mobile terminal 100 authenticated by the authentication processing unit 270.

Figure 6:
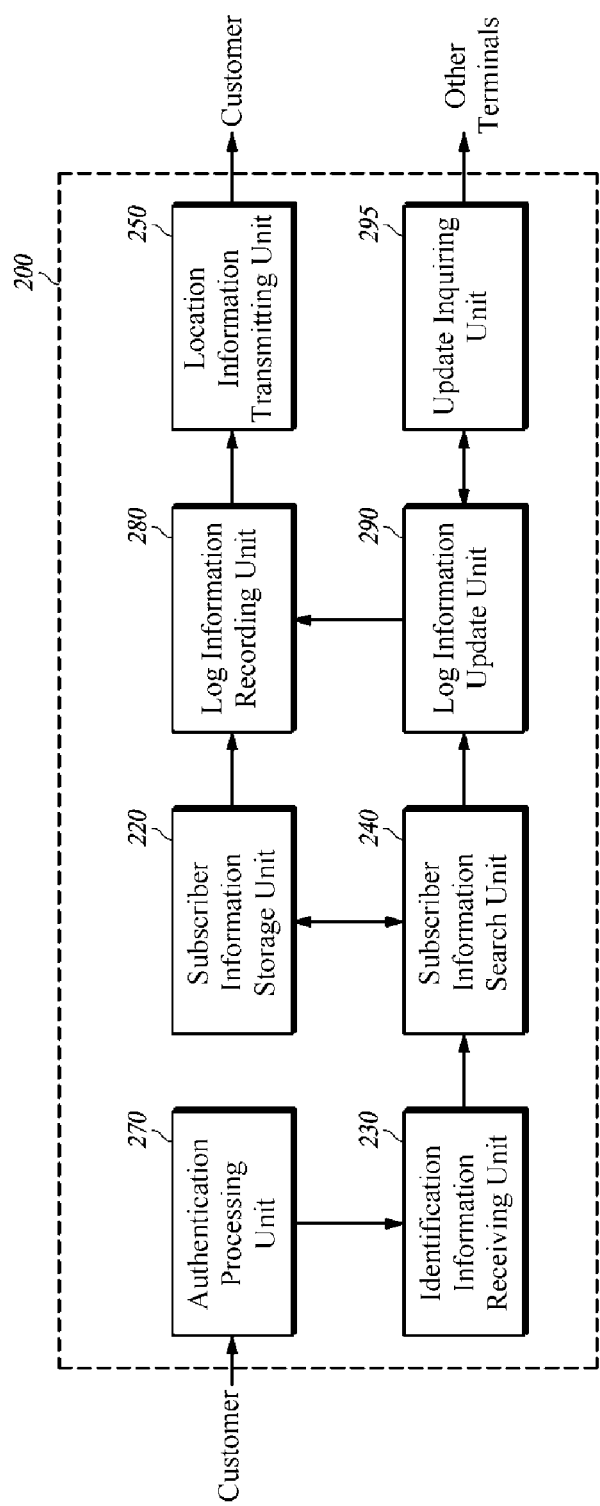
FIG. 6 is a diagram schematically showing yet another embodiment of a configuration of a service server usable in the log information providing/inquiring system of FIG. 1.

FIG. 6 is a diagram schematically showing yet another embodiment of a configuration of a service server usable in the log information providing/inquiring system of FIG. 1. Referring to FIG. 6, a service server 200 according to one embodiment of the present disclosure may include a subscriber information storage unit 220, a log information recording unit 280, an identification information receiving unit 230, a subscriber information search unit 240, a log information update unit 290, an update inquiring unit 295, a location information transmitting unit 250, and, an authentication processing unit 270. Herein, like reference numerals will be used to denote elements identical to or similar to the elements of the service server of FIG. 4.

The subscriber information storage unit 220 stores identification information of subscriber terminals. In this case, the subscriber information storage unit 220 may store MAC addresses of the WLAN/WPAN communication modules 101 of the customer terminal 100 subscribing to a log information providing service for the other terminals 110 as the identification information of the subscriber terminals.

The log information recording unit 280 interworks with the positioning server 210 and records log information including access time point and location information of subscriber terminals in the event of access by the subscriber terminals corresponding to the subscriber terminal identification information stored in the subscriber information storage unit 220.

The identification information receiving unit 230 receives identification information of WLAN/WPAN communication modules of one or more adjacent other terminals 110 from the customer terminal 100. Specifically, the customer terminal 100 may be implemented by a wired terminal provided in a specific region and acquire identification information of the WLAN/WPAN communication modules of the other terminals 110 moving in the region, or may be implemented by a mobile terminal and acquire identification information of the WLAN/WPAN communication modules of the adjacent other terminals 110 that is moving together.

The subscriber information search unit 240 searches the subscriber identification information stored in the subscriber information storage unit 220 for subscriber identification information matching with the identification information of the WLAN/WPAN communication modules of the other terminals 110 received through the identification information receiving unit 230. In this case, the subscriber information search unit 240 may transmit a subscriber list corresponding to the searched subscriber identification information to the customer terminal 100. For example, as described above, if the identification information elements of the WLAN/WPAN communication modules of the other terminals 110 received from the customer terminal 100 are A, B, C, and D, and when only A and B match with the subscriber identification information stored in the subscriber information storage unit 220, the list transmitting unit 260 may transmit a subscriber list corresponding to the subscriber identification information elements A and B to the customer terminal 100.

The log information update unit 290 interworks with the positioning server 210. The log information update unit 290 may inquire the current locations of the other terminals 110 corresponding to the subscriber identification information searched by the subscriber information search unit 240, and update the log information of the other terminals 110 if the log information recorded in the log information recording unit 280 is different from the current location inquired.

The update inquiring unit 295 may transmit an inquiry message for inquiring about update/non-update of the log information to the other terminals 110 corresponding to the subscriber identification information searched by the subscriber information search unit 240. In this case, the log information update unit 290 may update the log information if an update request signal is received from the other terminals 110 in response to the inquiry message transmitted to the other terminals 110 by the update inquiring unit 295.

The location information transmitting unit 250 may inquire the log information of the other terminals 110 corresponding to the searched subscriber identification information from the log information recording unit 280, and transmit the inquired log information of the other terminals 110 to the customer terminal 100. Specifically, if the update is rejected by the other terminals 110 in response to the inquiry message transmitted by the update inquiring unit 295 to the other terminals 110, the location information transmitting unit 250 may inquire the latest log information of the other terminals 110 from the log information recording unit 280 and transmit the latest log information to the customer terminal 100.

The authentication processing unit 270 authenticates the customer terminal 100 accesses the service server 200. Specifically, only the customer terminal 100 authenticated by the authentication processing unit 270 may receive a log information providing service for the other terminals 110 according to one embodiment of the present invention. To this end, the identification information receiving unit 230 may be configured to receive the identification information of the WLAN/WPAN communication modules of the other terminals 110 from the customer terminal 100 authenticated by the authentication processing unit 270.

Figure 7:
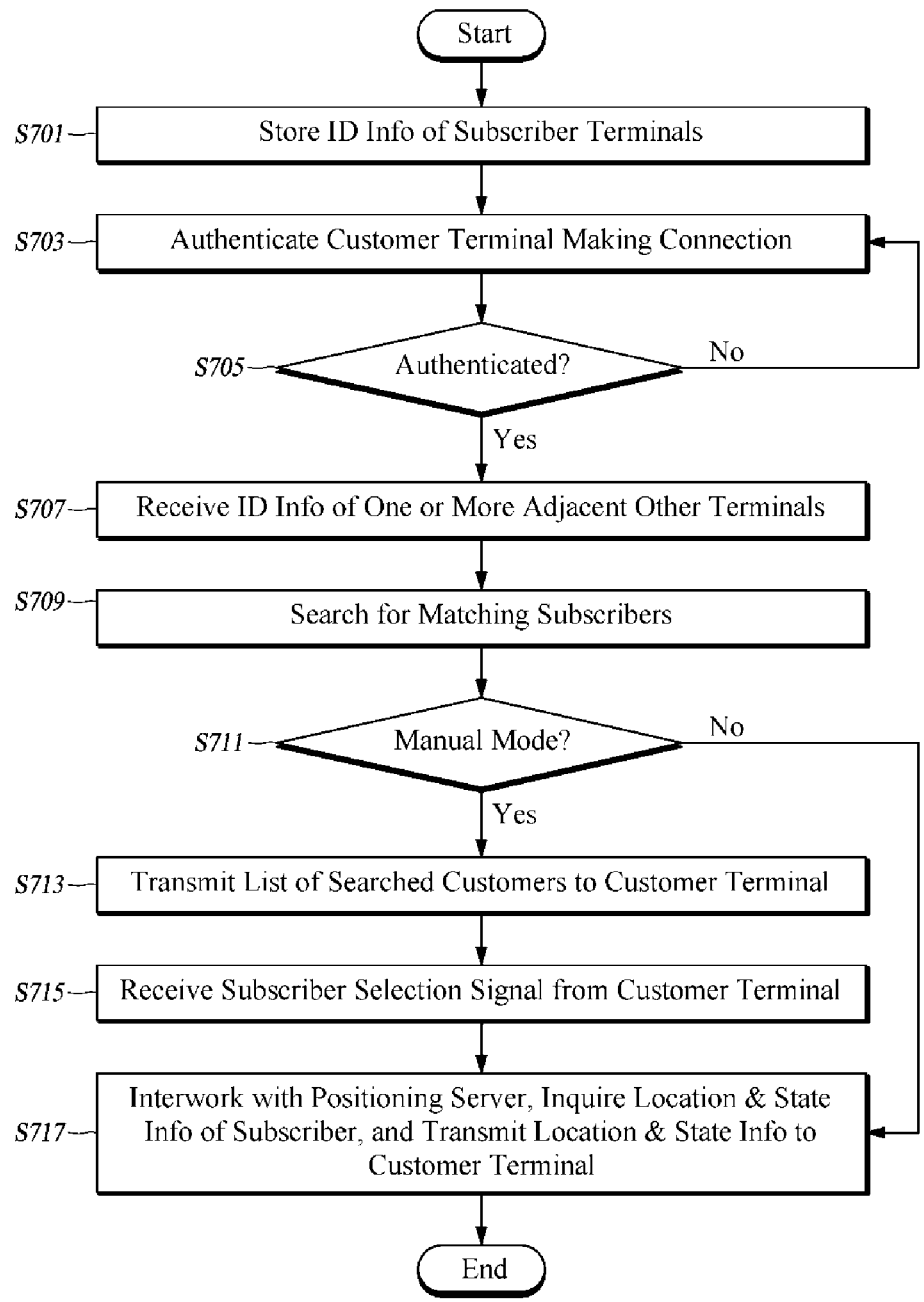
FIG. 7 is a flow diagram showing one embodiment of a location and state information providing method by a service server according to the present disclosure.

FIG. 7 is a flow diagram showing one embodiment of a location and state information providing method by a service server according to the present disclosure.

Referring to FIG. 7, the service server 200 providing location and state information of the other terminals 110 according to one embodiment of the present disclosure may store MAC addresses of WLAN/WPAN communication modules of subscriber terminals as identification information (S701).

The authentication processing unit 270 of the service server 200 authenticates the motile terminal 100 connected through the network 120 or the mobile network 130 (S703).

When the authentication of the mobile terminal 100 is completed by the authentication processing unit 270 (S705), the identification information receiving unit 230 receives identification information of WLAN/WPAN communication modules of one or more adjacent other terminals 110 from the mobile terminal 100 (S707).

The subscriber information search unit 240 searches the subscriber identification information stored in the subscriber information storage unit 220 for subscriber identification information matching with the identification information of the WLAN/WPAN communication modules of the other terminals 110 received through the identification information receiving unit 230 (S709).

At this point, in a manual mode, the list transmitting unit 260 may transmit a subscriber list corresponding to the subscriber identification information searched by the subscriber information search unit 240 to the mobile terminal 100 (S711 and S713).

In this case, if a subscriber selection signal is received from the mobile terminal 100 in response to the subscriber list transmitted by the list transmitting unit 260 (S715), the location information transmitting unit 250 may interwork with the positioning server 210 and transmit location and state information of the other terminals 110 corresponding to selected subscribers to the mobile terminal 100 (S717). In the case of an automatic mode (S711), the location information transmitting unit 250 may interwork with the positioning server 210 and transmit location and state information of the other terminals 110 corresponding to the subscriber identification information searched by the subscriber information search unit 240 to the mobile terminal 100.

Figure 8:
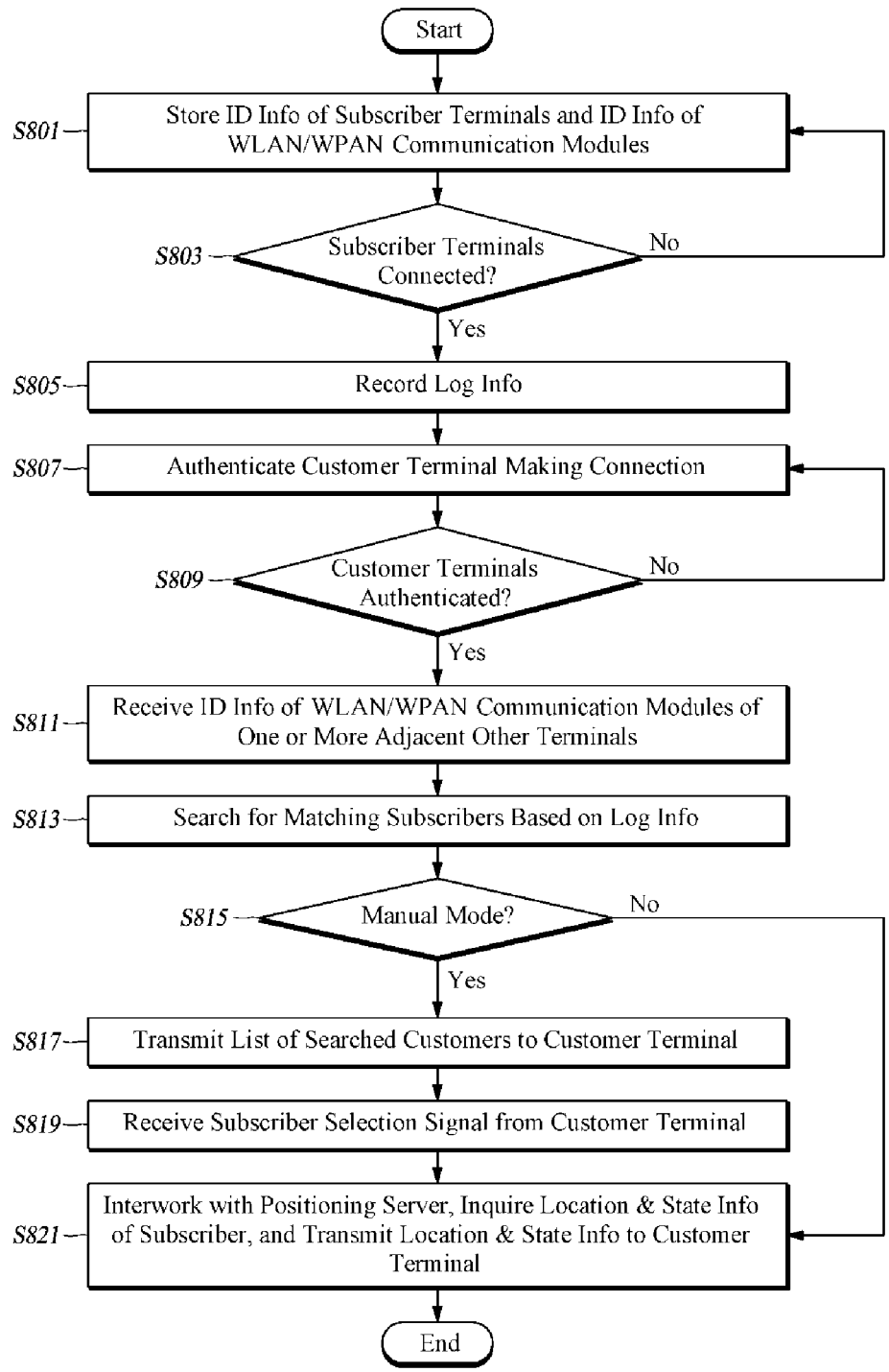
FIG. 8 is a flow diagram showing another embodiment of a location and state information providing method by a service server according to the present disclosure.

FIG. 8 is a flow diagram showing another embodiment of a location and state information providing method by a service server according to the present disclosure.

Referring to FIG. 8, the service server 200 providing location and state information of the other terminals 110 according to one embodiment of the present disclosure may store MIN information, IMSI information and MSISDN information of subscriber terminals and MAC addresses of WLAN/WPAN communication modules of the subscriber terminals as identification information (S801).

If the subscriber terminals stored in the subscriber information storage unit 220 are connected through the network 120 or the mobile network 130 (S803), the log information recording unit 280 records log information including access time point and location information of the subscriber terminals (S805).

The authentication processing unit 270 of the service server 200 authenticates the motile terminal 100 connected through the network 120 or the mobile network 130 (S807).

When the authentication of the mobile terminal 100 is completed by the authentication processing unit 270 (S809), the identification information receiving unit 230 receives identification information of WLAN/WPAN communication modules of one or more adjacent other terminals 110 from the mobile terminal 100 (S811).

The subscriber information search unit 240 searches the subscriber log information stored in the log information recording unit 230 for subscriber log information matching with the identification information of the WLAN/WPAN communication modules of the other terminals 110 received through the identification information receiving unit 230 (S813).

At this point, in a manual mode, the list transmitting unit 260 may transmit a subscriber list corresponding to the subscriber identification information searched by the subscriber information search unit 240 to the mobile terminal 100 (S815 and S817).

In this case, if a subscriber selection signal is received from the mobile terminal 100 in response to the subscriber list transmitted by the list transmitting unit 260 (S819), the location information transmitting unit 250 may inquire log information of the other terminals 110 corresponding to the subscribers selected from the log information recording unit 280 and transmit the log information to the mobile terminal 100 (S821). In the case of an automatic mode (S815), the location information transmitting unit 250 may interwork with the positioning server 210 and transmit location and state information of the other terminals 110 corresponding to the subscriber identification information searched by the subscriber information search unit 240 to the mobile terminal 100.

Figure 9:
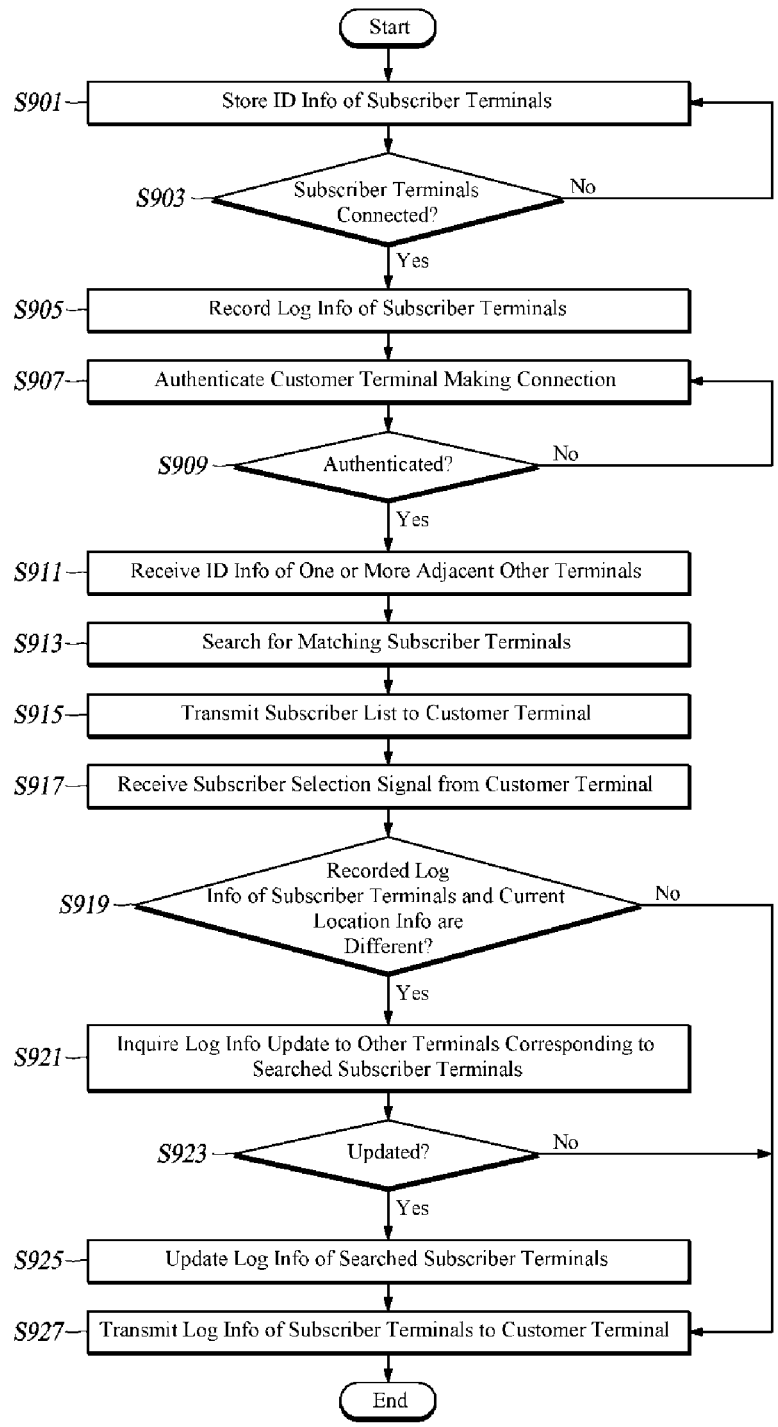
FIG. 9 is a flow diagram showing a log information providing method by a service server according to the present disclosure.

FIG. 9 is a flow diagram showing a log information providing method by a service server according to the present disclosure.

Referring to FIG. 9, the service server 200 according to one embodiment of the present disclosure may store MAC addresses of WLAN/WPAN communication modules of subscriber terminals as identification information (S901).

If subscriber terminals subscribing to a log information providing service according to one embodiment of the present disclosure are connected through the network 120 or the mobile network 130 (S803), the log information recording unit 280 may record log information including access time point and location information of the subscriber terminals (S905).

On the other hand, if the customer terminal 100 accesses the service server 200 in order to inquire log information of the other terminals 110, the authentication processing unit 270 authenticates the customer terminal 100 connected through the network 120 or the mobile network 130 (S907). The log information inquiring method by the customer terminal 100 will be described later in detail.

When the authentication of the customer terminal 100 is completed by the authentication processing unit 270 (S909), the identification information receiving unit 240 receives identification information of WLAN/WPAN communication modules of one or more adjacent other terminals 110 from the customer terminal 100 (S911).

The subscriber information search unit 240 searches the subscriber identification information stored in the subscriber information storage unit 220 for subscriber identification information matching with the identification information of the WLAN/WPAN communication modules of the other terminals 110 received through the identification information receiving unit 230 (S913).

In this case, the subscriber information search unit 240 may transmit a subscriber list corresponding to the searched subscriber identification information to the customer terminal 100 (S915), and receive a subscriber selection signal from the customer terminal 100 accordingly (S917).

If the log information of subscriber terminals searched by the subscriber information search unit 240 is different from the current locations of the other terminals 110 corresponding to the subscriber terminals (S919), the update inquiring unit 295 may transmit an inquiry message for inquiring about update/non-update of the log information to the other terminals 110 (S921). In this case, when a request signal for requesting update of the log information is received from the other terminals 110 (S923), the log information update unit 260 updates the log information of the other terminals 110 (S925). In this case, the location information transmitting unit 250 may transmit updated log information of the other terminals 110 to the customer terminal 100 (S927).

If the log information of the subscriber terminals searched by the subscriber information search unit 240 is identical to the current location information of the other terminals 1110, if a rejection signal is received from the other terminals 110 in response to an inquiry message transmitted by the update inquiring unit 295 to the other terminals 110, or if a response signal is not received within a predetermined time, the location information transmitting unit 250 may inquire log information of subscriber terminals searched from the log information recording unit 280 and transmit the log information to the customer terminal 100.

Figure 10:
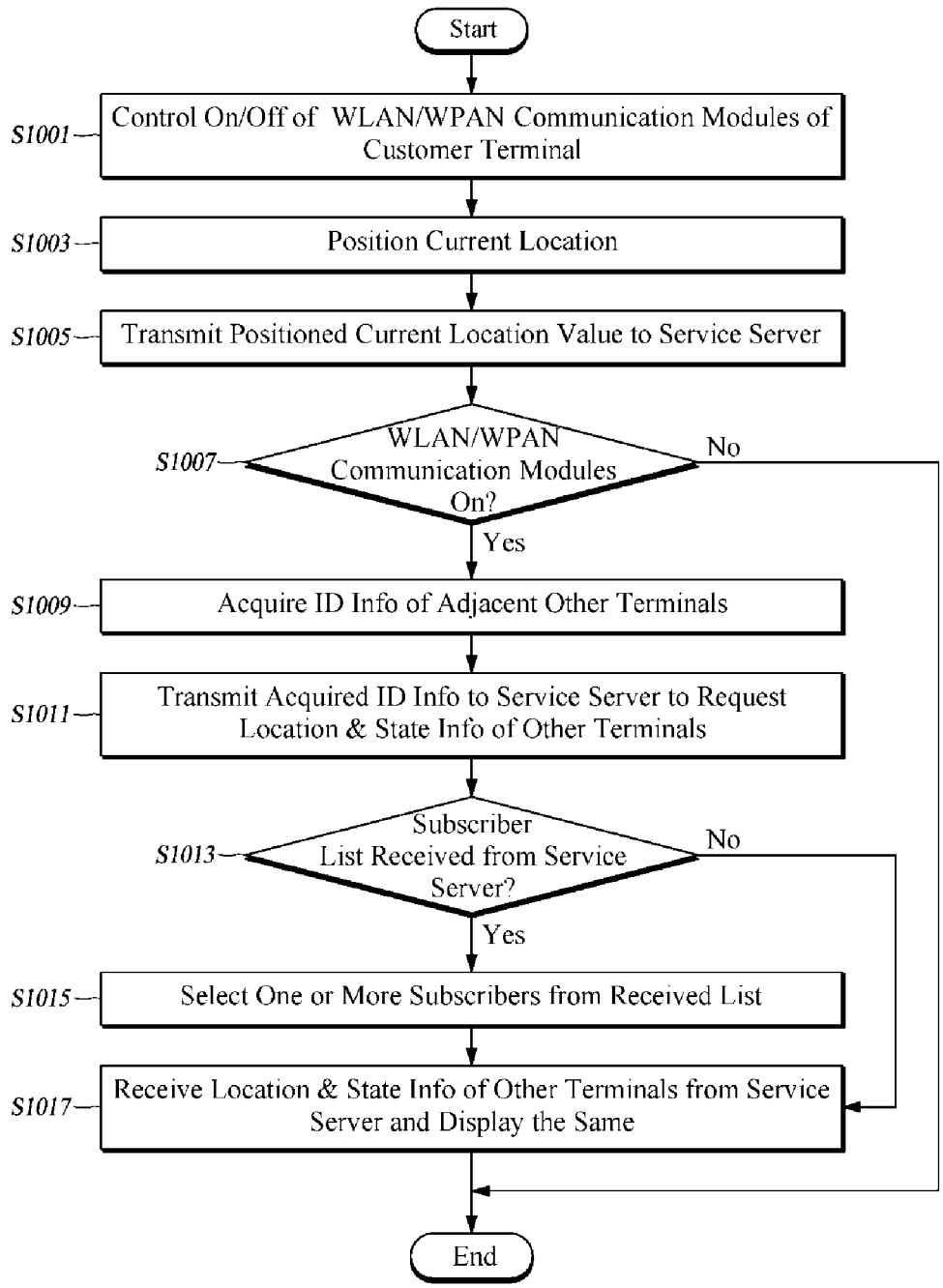
FIG. 10 is a flow diagram showing an example of a location and state information inquiring method by a mobile terminal according to the present disclosure.

FIG. 10 is a flow diagram showing an example of a location and state information inquiring method by a mobile terminal according to the present disclosure.

Referring to FIG. 10, in order to inquire location and state information of the other terminals 110 according to one embodiment of the present disclosure, the on/off control unit 102 may control an on/off of the WLAN/WPAN communication modules 101 of the mobile terminal 100 (S1001).

The positioning unit 107 may position the current location of the mobile terminal 100 (S1003), and a location value of the mobile terminal 100 positioned by the positioning unit 107 may be transmitted and stored to the positioning server 210 (S1005). In this case, the positioning of the location of the mobile terminal 100 by the positioning unit 107 may be performed only when a request signal is received through the positioning server 210.

When the WLAN/WPAN communication unit 101 of the mobile terminal 100 is turned on (S1007), the WLAN/WPAN communication unit 101 acquires identification information of the WLAN/WPAN communication modules of the other terminals 110 adjacent to the mobile terminal 100 (S1009).

The request unit 103 transmits the identification information of the WLAN/WPAN communication modules of the other terminals 110 acquired through the WLAN/WPAN communication unit 101 to the service server 200 to inquire about service subscription/unsubscription of the other terminals 110 and request location and state information of the other terminals 110 that are service subscribers (S1011).

Among the identification information of the WLAN/WPAN communication modules of the other terminals 110 transmitted by the request unit 103, the list receiving unit 105 may receive a subscriber list corresponding to the other terminals 110 subscribing to the service from the service server 200 (S1013).

The subscriber selecting unit 106 selects one or more subscribers from the subscriber list received from the service server 200 (S1015). In this case, the user interface unit 104 may receive location and state information of the other terminals 110 corresponding to subscribers selected by the subscriber selecting unit 106 from the service server 200, and display the location and state information of the other terminals 110 on a screen of the mobile terminal 100 (S1017).

In another example, instead of receiving the subscriber list, the user interface unit 104 may receive location and state information of all the other terminals 110 subscribing to a location and state information providing service for the other terminals according to one embodiment of the present disclosure, among the identification information of the WLAN/WPAN communication modules of the other terminals 110 transmitted by the request unit 103, and display the location and state information received on a screen of the mobile terminal 100.

Figure 11:
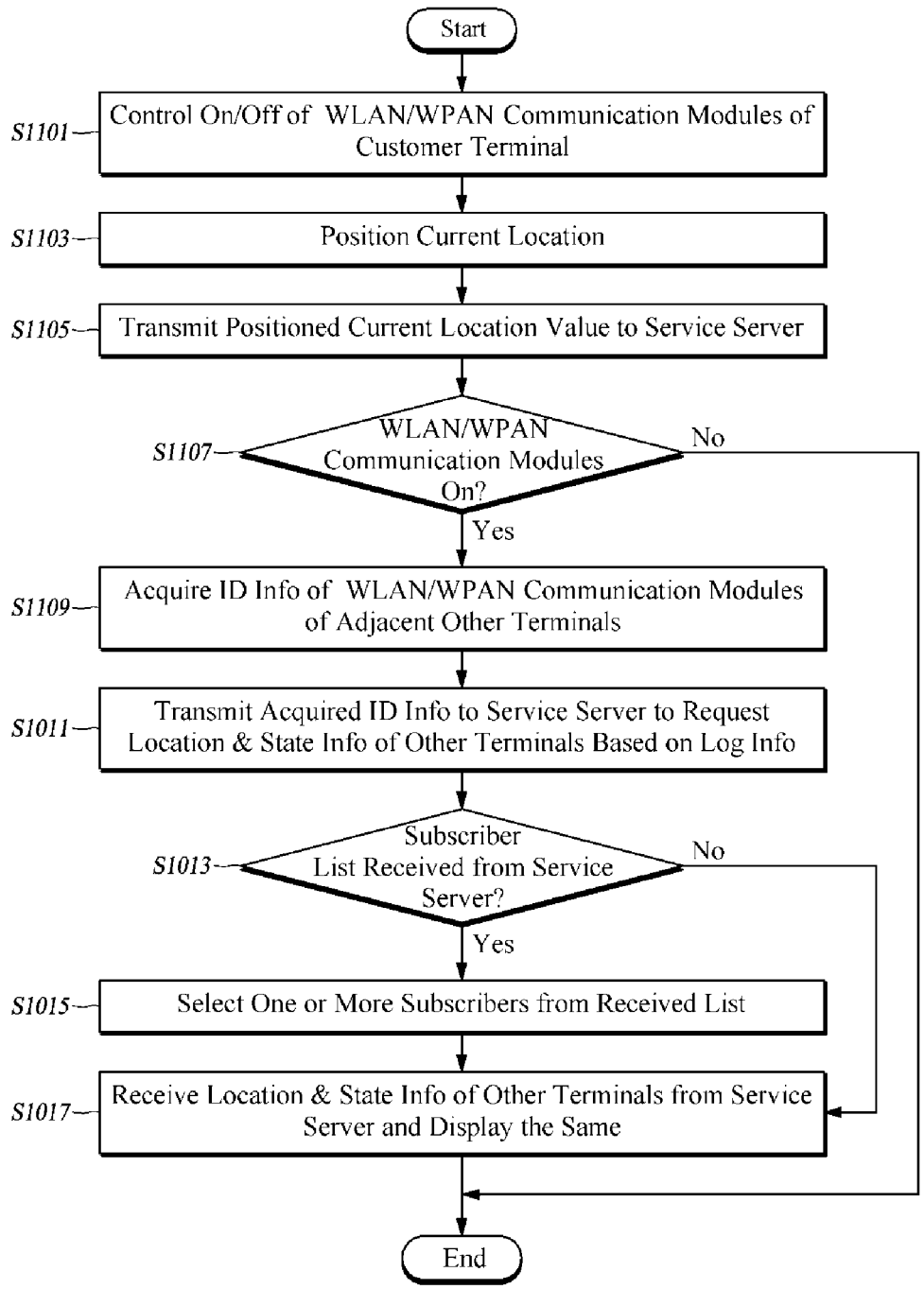
FIG. 11 is a flow diagram showing another example of a location and state information inquiring method by a mobile terminal according to the present disclosure.

FIG. 11 is a flow diagram showing another example of a location and state information inquiring method by a mobile terminal according to the present disclosure.

Referring to FIG. 11, in order to inquire location and state information of the other terminals 110 according to one embodiment of the present disclosure, the on/off control unit 102 may control an on/off of the WLAN/WPAN communication modules 101 of the mobile terminal 100 (S1101).

The positioning unit 107 may position the current location of the mobile terminal 100 (S1103), and a location value of the mobile terminal 100 positioned by the positioning unit 107 may be transmitted and stored to the positioning server 210 (S1105). In this case, the positioning of the location of the mobile terminal 100 by the positioning unit 107 may be performed only when a request signal is received through the positioning server 210.

When the WLAN/WPAN communication unit 101 of the mobile terminal 100 is turned on (S1107), the WLAN/WPAN communication unit 101 acquires identification information of the WLAN/WPAN communication modules of the other terminals 110 adjacent to the mobile terminal 100 (S1109).

The request unit 103 transmits the identification information of the WLAN/WPAN communication modules of the other terminals 110 acquired through the WLAN/WPAN communication unit 101 to the service server 200 to request location and state information of the other terminals 110 based on the log information recorded (S1011).

Among the identification information of the other terminals 110 transmitted by the request unit 103, the list receiving unit 105 may receive a subscriber list corresponding to the other terminals 110 whose log information is recorded (S1013).

The subscriber selecting unit 106 selects one or more subscribers from the subscriber list received from the service server 200 (S1015). In this case, the user interface unit 104 may receive location and state information of the other terminals 110 corresponding to subscribers selected by the subscriber selecting unit 106 from the service server 200, and display the location and state information of the other terminals 110 on a screen of the mobile terminal 100 (S1017).

In another example, instead of receiving the subscriber list, the user interface unit 104 may receive location and state information of all the other terminals 110 subscribing to a location and state information providing service for the other terminals according to one embodiment of the present disclosure, among the identification information of the other terminals 110 transmitted by the request unit 103, and display the location and state information received on a screen of the mobile terminal 100.

Figure 12:
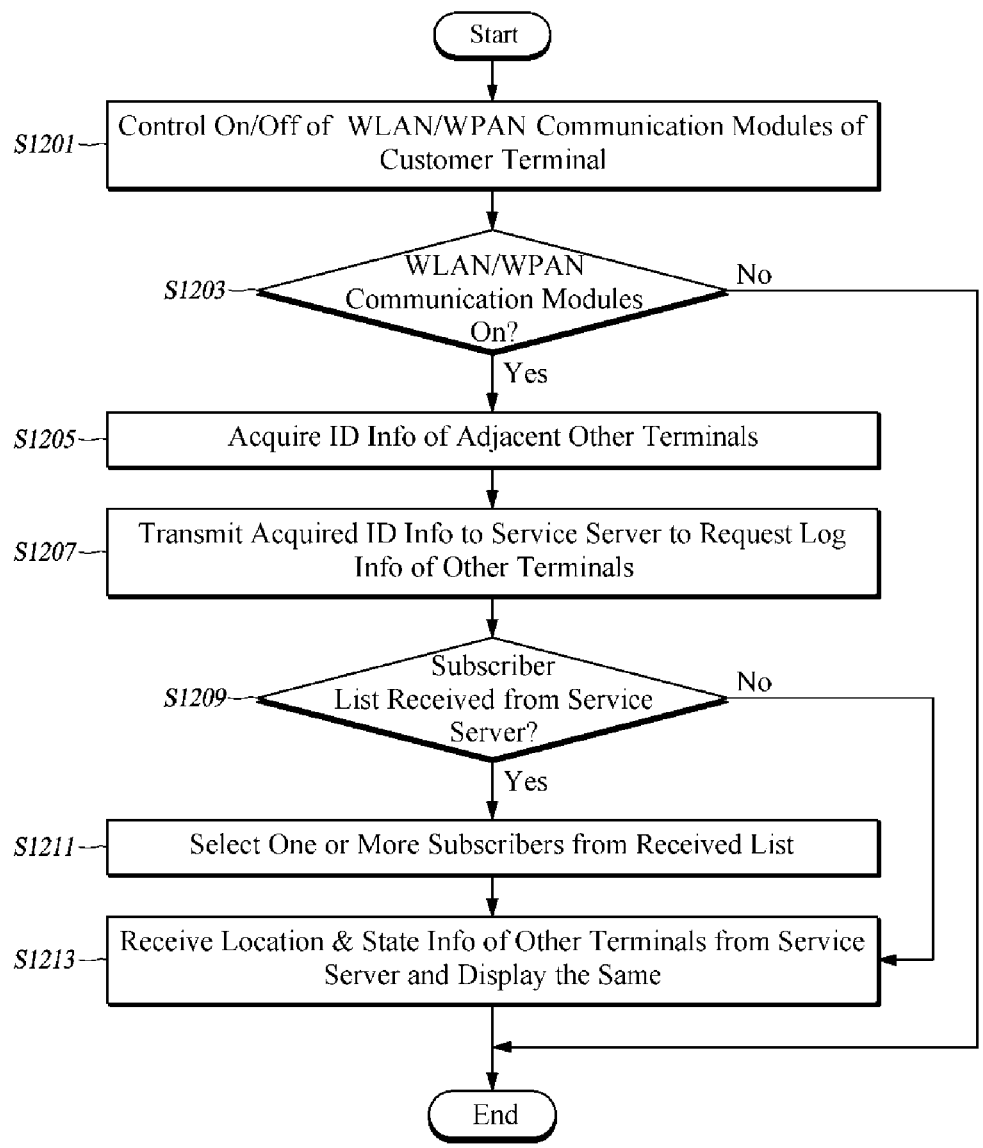
FIG. 12 is a flow diagram showing a log information inquiring method by a customer terminal according to the present disclosure.

FIG. 12 is a flow diagram showing a log information inquiring method by a customer terminal according to the present disclosure.

Referring to FIG. 12, in order to inquire location and state information of the other terminals 110 according to one embodiment of the present disclosure, the on/off control unit 102 may control an on/off of the WLAN/WPAN communication modules 101 of the customer terminal 100 (S1201).

When the WLAN/WPAN communication unit 101 of the customer terminal 100 is turned on (S1203), the WLAN/WPAN communication unit 101 acquires identification information of the WLAN/WPAN communication modules of the other terminals 110 adjacent to the customer terminal 100 (S1205).

The update request unit 103 may transmit the identification information of the WLAN/WPAN communication modules of the other terminals 110 acquired through the WLAN/WPAN communication unit 101 to the service server 200 to request log information of the other terminals 110 (S1207). Among the identification information of the WLAN/WPAN communication modules of the other terminals 110 transmitted by the update request unit 103, the list receiving unit 105 may receive a subscriber list corresponding to the other terminals 110 subscribing to the service from the service server 200 (S1209).

When receiving a subscriber list from the service server 200, the subscriber selecting unit 106 may select one or more subscribers from the subscriber list received (S1211). In this case, the user interface unit 104 may receive log information of the other terminals 110 corresponding to subscribers selected by the subscriber selecting unit 106 from the service server 200, and display the log information of the other terminals 110 on a screen of the customer terminal 100 (S1213).

In another example, instead of receiving the subscriber list, the user interface unit 104 may receive log information of all the other terminals 110 subscribing to a log information providing service for the other terminals according to one embodiment of the present disclosure, among the identification information of the WLAN/WPAN communication modules of the other terminals 110 transmitted by the update request unit 103, and display the log information received on a screen of the customer terminal 100.

The above process may be realized by a program, and the program may be stored in a recording medium that can be driven by a computer. Herein, the computer does not refer to only a general PC (Personal Computer), but should be understood as a broad sense that can execute the program by driving the recording medium.

According to various embodiments of the present disclosure, the location and state information providing/inquiring system, the service server, and the mobile terminal can search adjacent other terminals in real time by using WLAN/WPAN communication such as Bluetooth, UWB, and Zigbee when a positioner is moving, and use location and state information of terminals subscribing the same service among the adjacent other terminals searched.

In addition, some embodiments of the present disclosure is able to search other terminals adjacent to a mobile terminal by using a WLAN/WPAN communication module when a subscriber of a location and state information providing/inquiring service uses a plurality of terminals by the same phone number, or when one terminal includes a plurality of WLAN/WPAN communication modules, and search log information based on identification information of other terminals and identification information of WLAN/WPAN communication modules of the other terminals, thereby preventing an unnecessary communication process from being performed on a WLAN/WPAN communication module or a terminal that is not in use.

In addition, according to various embodiments of the present disclosure, the log information providing/inquiring system, the service server, and the customer terminal can search adjacent other terminals in real time by using WLAN/WPAN communication such as Bluetooth, UWB, and Zigbee when a positioner is moving in a service of providing log information including access time point and location information of subscriber terminals, and provide/inquire log information of others in real time by performing an update when location and log information of terminals subscribing the same service among the adjacent other terminals searched are different.

Although exemplary aspects of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary aspects of the present disclosure have not been described for limiting purposes. Accordingly, the scope of the claimed invention is not to be limited by the above aspects but by the claims and the equivalents thereof.

What is claimed is:

1. A mobile terminal device for positioning, comprising:
   a wireless local area network (WLAN)/wireless personal area network (WPAN) communication unit configured to acquire identification information of one or more WLAN/WPAN communication modules of one or more other terminal devices adjacent to the mobile terminal;
   a request unit configured to transmit the identification information of the WLAN/WPAN communication modules to a service server to
      inquire whether the other terminal devices subscribe a service subscribed by the mobile terminal device, and
      request location and state information of the other terminal devices that subscribe the service, wherein the location and state information of the other terminal devices is inquired to a positioning server by the service server, and searched by interworking with the positioning server; and
   a user interface unit configured to
      receive the location and state information of the other terminal devices from the service server and
      display the location and state information of the other terminal devices that subscribe the service on a screen.

2. The mobile terminal device of claim 1, further comprising:
   a list receiving unit configured to receive a list of service subscribers corresponding to the location and state information of the other terminal devices from the service server; and
   a subscriber selecting unit configured to receive one or more service subscribers from the list of service subscribers,
   wherein the user interface unit receives the location and state information of the selected service subscribers and displays the location and state information on the screen.

3. The mobile terminal device of claim 1, wherein the WLAN/WPAN communication unit is configured to acquire Media Access Control (MAC) addresses of the WLAN/WPAN communication modules of the other terminal devices.

4. The mobile terminal device of claim 1, further comprising:
   a positioning unit configured to position a current location; and
   a location transmitting unit configured to transmit a value of the current location positioned by the positioning unit to the service server.

5. The mobile terminal device of claim 1, further comprising
   an on/off control unit configured to control an ON/OFF of the WLAN/WPAN communication unit.

6. The mobile terminal device of claim 1, further comprising
   an update request unit configured to transmit the identification information of the WLAN/WPAN communication modules to a service server to request an update of log information of the other terminal devices, the log information including access time point and location information for each of the access time point,
   wherein the user interface unit is configured to receive undated log information of the other terminal devices as the location information of the other terminal devices.

7. A method for inquiring location and state information of other terminal devices, the method comprising:
   acquiring identification information of one or more wireless local area network (WLAN)/wireless personal area network (WPAN) communication modules of one or more other terminal devices adjacent to the mobile terminal;
   transmitting the identification information of the WLAN/WPAN communication modules to a service server so as to inquire whether the other terminal devices subscribe a service subscribed by the mobile terminal device and request location and state information of the other terminal devices that subscribe the service, wherein the location and state information of the other terminal devices is inquired to a positioning server by the service server, and searched by interworking with the positioning server; and
   receiving location and state information of the other terminal devices from the service server and displaying the location and state information on a screen.

8. The method of claim 7, further comprising:
   receiving a list of subscribers corresponding to the identification information of the WLAN/WPAN communication modules from the service server; and
   selecting one or more subscribers from the list of subscribers,
   wherein the displaying comprises displaying received location and state information of the selected subscribers on the screen.

9. The method of claim 7, wherein the identification information is Media Access Control (MAC) addresses of the WLAN/WPAN communication modules of the other terminal devices.

10. The method of claim 7, further comprising:
    positioning a current location; and
    transmitting a value of the current location to the service server.

11. The method of claim 7, further comprising:
    transmitting the identification information of the WLAN/WPAN communication modules to a service server so as to request an update of log information of the other terminal devices, the log information including access time point and location information for each of the access time point; and
    receiving undated log information of the other terminal devices as the location information of the other terminal devices.

12. A mobile terminal device for positioning, comprising:
    a wireless local area network (WLAN)/wireless personal area network (WPAN) communication unit configured to acquire identification information of one or more WLAN/WPAN communication modules of one or more other terminal devices adjacent to the mobile terminal;
    a request unit configured to transmit the identification information of the WLAN/WPAN communication modules to a service server to inquire whether the other terminal devices subscribe a service and request location and state information of the other terminal devices that subscribe the service;
    a user interface unit configured to
       receive the location and state information of the other terminal devices from the service server and
       display the location and state information of the other terminal devices that subscribe the service on a screen; and
    an update request unit configured to transmit the identification information of the WLAN/WPAN communication modules to a service server to request an update of log information of the other terminal devices, the log information including access time point and location information for each of the access time point,
    wherein the user interface unit is configured to receive undated log information of the other terminal devices as the location information of the other terminal devices.

13. A method for inquiring location and state information of other terminal devices, the method comprising:
    acquiring identification information of one or more wireless local area network (WLAN)/wireless personal area network (WPAN) communication modules of one or more other terminal devices adjacent to the mobile terminal;
    transmitting the identification information of the WLAN/WPAN communication modules to a service server so as to inquire whether the other terminal devices subscribe a service and request location and state information of the other terminal devices that subscribe the service; and
    receiving location and state information of the other terminal devices from the service server and displaying the location and state information on a screen; and
    transmitting the identification information of the WLAN/WPAN communication modules to a service server so as to request an update of log information of the other terminal devices, the log information including access time point and location information for each of the access time point; and
    receiving undated log information of the other terminal devices as the location information of the other terminal devices.

\* \* \* \* \*